March 16, 1926.
W. S. BEEKLEY
MARINE PROPULSION PADDLE WHEEL
Filed Sept. 14, 1925
1,576,641
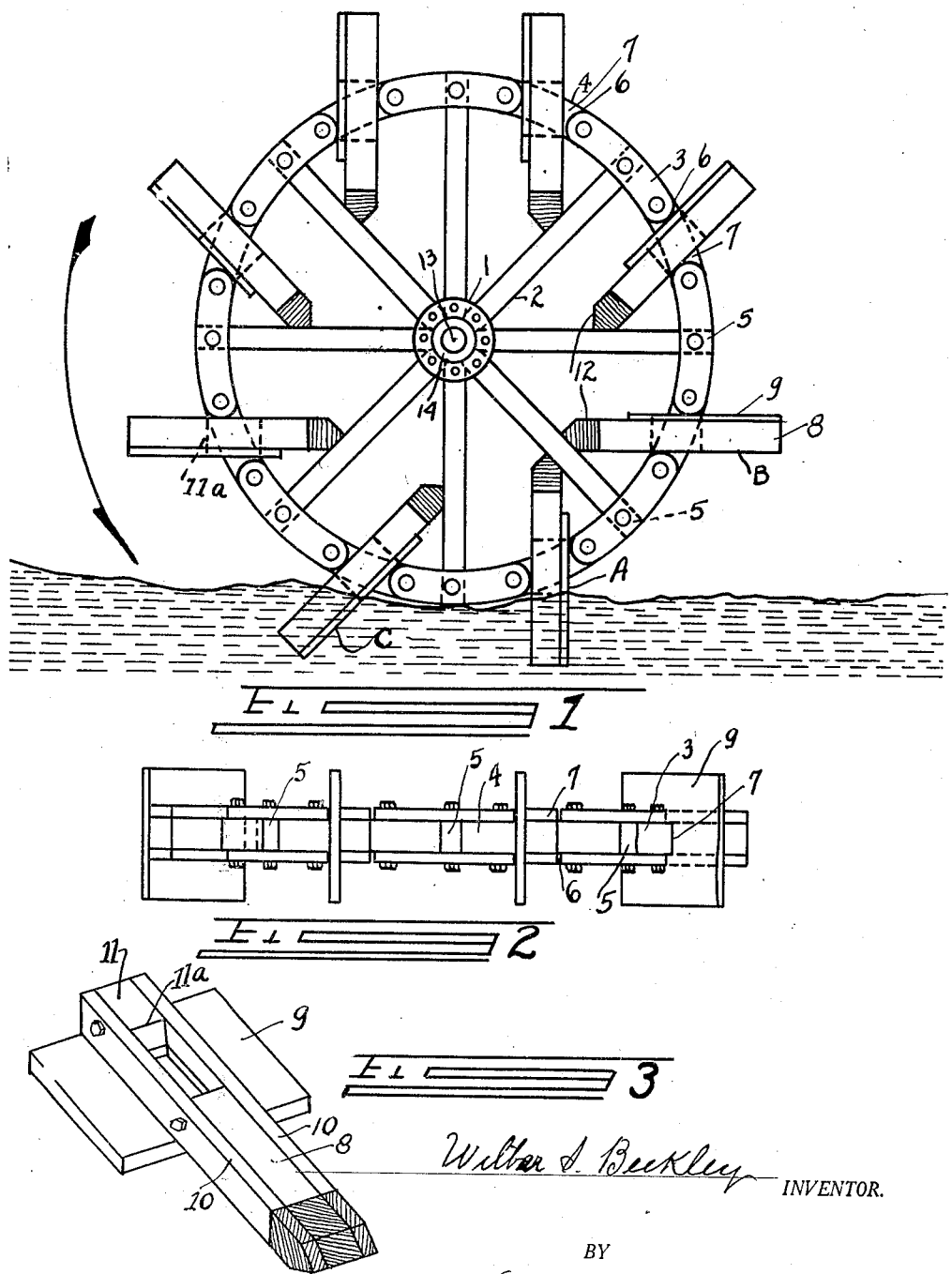

Patented Mar. 16, 1926.

1,576,641

UNITED STATES PATENT OFFICE.

WILBER S. BEEKLEY, OF GLENDALE, OHIO.

MARINE PROPULSION PADDLE WHEEL.

Application filed September 14, 1925. Serial No. 56,190.

*To all whom it may concern:*

Be it known that I, WILBER S. BEEKLEY, a citizen of the United States, and a resident of Glendale, in the county of Hamilton and State of Ohio, have invented certain new and useful Improvements in Marine Propulsion Paddle Wheels, of which the following is a full, clear, and exact description, reference being had to the accompanying drawings, forming part of this specification.

My invention relates to marine propelling devices and particularly to feathering paddle wheels adapted for use for driving marine vessels.

It is the object of my invention to provide a wheel with paddles pivotally retained on the wheel, which shall be of feathering type, adapted to feather a short interval subsequent to their emerging from the water thereby preventing loss of power due to lifting excess water.

It is a further object of my invention to provide a paddle wheel with feathering blades which will automatically shift with the reversal of the wheel and no matter which direction the wheel is turned the blades will strike the water in an oblique downwardly direction.

For propelling marine vessels paddle wheels would be much more efficient if it were not for the fact that at the time when the paddles emerge from the water they carry with them a great bulk of water which is a great drag on the mechanism operating the wheel.

Referring to the drawings in which I have illustrated a preferred feathering paddle wheel construction:

Figure 1 is a side elevation of a complete paddle wheel illustrating my invention.

Figure 2 is a plan view of the wheel shown in Figure 1.

Figure 3 is a perspective view of one of the feathering paddles.

Generally indicated at 1 is the central holding plate to which is secured by bolts or other suitable securing means, the radially extending spokes 2 of the wheel formed with outer pieces 3 extending as a rim about the spokes. The rim is composed of three thicknesses comprising the outer pieces 3 on each side, and inner pieces 4 on which the paddles are pivotally mounted, and which have slots 5 for retaining the spokes. The outer pieces are beveled as indicated at 6 and the beveled portions form suitably interspaced grooves 7 in the outer periphery of the rim to retain the feathering paddles and permit sufficient pivotal movement to accomplish the desired feathering of the paddle upon emersion from the water.

The paddles are formed of arms 8 to which the blades 9 are secured. The paddle arms may be made of three thicknesses of pieces with the outer pieces 10 extending throughout the length of the arm and inner pieces 11 cut away to form a slot 11$^a$ of equivalent size of the central piece of the rim so that between each spoke of the wheel a paddle is slidingly disposed on the central piece 4 of the rim, and within the grooves 7. The inner ends of the paddle arms are weighted as indicated at 12 so that as the paddle indicated at A emerges from the water and moves to the position indicated at B the paddle is tilted by the weighted end, and the water which would otherwise be carried around with the wheel is allowed to flow off. the paddle on the inner side of the blade. The spokes 2 thus limit the movement of the weighted ends 12 of the paddles during the feathering of the paddles.

The further advantage will be noted that the paddle entering the water at C is in position to push down into the water, which action is desirable as it transmits more forward motion to the boat. It will also be noted that if the wheel be reversed to back up the vessel that the paddle at A will rock across and enter the water in the exact reverse position of the paddle indicated in the figure at C. Thus the desirable effects of downward slanting blades are provided which operate regardless of the direction the boat is to be moved.

In assembling the entire paddle wheel only seven different sized and shaped pieces are required, which may be suitably made of wood or other light material. Although the preferred form of paddle illustrated is structurally desirable for steamboats and the like which employ paddle wheels, the simplicity of the wheel makes it particularly adapted as a model for children's building sets.

The operation of the wheel on a marine vessel is in accordance with regular paddle wheel mounting. A shaft 13 may be extended through a hole 14 in the central part of the plate 1 and the shaft keyed in the hole. The shaft is then rotated and the paddle wheel turns counterclockwise in the direction of the arrow in Figure 1, moving the vessel from right to left in the figure. The drawing indicates the preferred arrangement for driving the vessel forward with the blades entering the water before the arms on which the blades are mounted.

In addition to preventing waste of power by lifting a great bulk of water, the position of the paddles at the time they enter the water provides an upward lift to the boat which is desirable.

Having thus described my invention, what I claim as new and desire to secure by Letters Patent, is:—

1. A feathering blade paddle wheel comprising a hub portion, spokes and a rim, the rim having interspaced grooves in the sides thereof, paddles pivotally retained in the rim, said paddles composed of arm portions with blades attached to the arms, the paddles having slots of equivalent width of the rim between the grooves, weights on the paddles at their inner ends, and the weighted ends adapted to abut the spokes thereby limiting the feathering of the paddles.

2. In a feathering blade paddle wheel, a hub portion, spoke portions, and a rim portion, paddles with slots therein, cut-away portions of the rim adapted to slidingly engage the slots of said paddles, weights on the paddles, and the paddles disposed on the rim with inner portions of the paddles adapted to engage the spokes at the limits of movement of said paddles in their feathering stroke.

3. A blade for a paddle wheel comprising a body portion with a weight on its inner end, a blade on the outer end of the paddle, and a groove in the body and the paddle adapted to pivotally engage the rim of a paddle wheel.

4. A blade for a paddle wheel comprising a body portion with a weight on its inner end, a blade on the outer end of the paddle, and a groove in the body and the paddle adapted to pivotally engage the rim of a paddle wheel, a wheel with a rim adapted to be mounted on a shaft, the wheel being provided with means to limit the pivoting of the body portion of the paddle.

5. A paddle wheel with feathering paddles, the paddle wheel comprising an outer rim portion with slots cut radially adapted to provide central portions, and paddles with weighted ends and grooves adapted to seat on the central portions and to be slidably pivoted on the central portions, and means of limiting the pivotal movement of the paddles.

6. A paddle wheel with feathering paddles, the paddle wheel comprising an outer rim portion with slots cut radially adapted to provide central portions, and paddles with weighted ends and grooves adapted to seat on the central portions, and to be slidably pivoted on the central portions, and means of limiting the pivotal movement of the paddles, and the weighted ends of the paddles adapted to tilt the paddles with their inner ends inclined downward at intervals during a cycle of revolution of the paddle wheel subsequent to the emerging of the paddles from the water.

7. A paddle wheel for marine propulsion comprising a hub portion, spoke portions and an outer rim, feathering blades pivotally mounted in the rim, and the spokes adapted to limit the feathering of the paddles.

8. A paddle wheel for marine propulsion comprising a rim portion mounted with spokes on a hub, blades mounted on the rim and said blades provided with mounting means adapted to permit feathering so as to enter the water at oblique angles with rotation of the wheel in either direction.

WILBER S. BEEKLEY.